(12) United States Patent
Yashiro et al.

(10) Patent No.: US 9,168,834 B2
(45) Date of Patent: Oct. 27, 2015

(54) VEHICLE

(71) Applicant: MITSUBISHI JIDOSHA KOGYO KABUSHIKI KAISHA, Tokyo (JP)

(72) Inventors: Hiroyuki Yashiro, Tokyo (JP); Naoki Kawashima, Tokyo (JP); Hiroki Fukatsu, Tokyo (JP); Masahide Shiba, Tokyo (JP); Takuma Maeda, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 185 days.

(21) Appl. No.: 14/092,158

(22) Filed: Nov. 27, 2013

(65) Prior Publication Data

US 2014/0163777 A1  Jun. 12, 2014

(30) Foreign Application Priority Data

Dec. 11, 2012  (JP) ................................ 2012-270646

(51) Int. Cl.
*B60L 1/00* (2006.01)
*B60L 1/02* (2006.01)
(Continued)

(52) U.S. Cl.
CPC . *B60L 1/003* (2013.01); *B60L 1/02* (2013.01); *B60L 1/14* (2013.01); *B60L 11/184* (2013.01); *B60L 11/185* (2013.01); *B60L 11/1816* (2013.01); *B60L 11/1844* (2013.01);
(Continued)

(58) Field of Classification Search
CPC ............. B60L 1/02; B60L 1/003; B60L 1/14; B60L 11/1816; B60L 11/184; B60L 11/1844; B60L 11/1846; B60L 11/185; B60L 11/1859; B60L 11/1861; B60L 11/1868; B60L 11/1848; Y02T 10/7005; Y02T 90/16

USPC ............................................................ 701/2
See application file for complete search history.

(56) References Cited

U.S. PATENT DOCUMENTS

2011/0283132 A1* 11/2011 Song et al. .................... 713/340
2014/0088794 A1*  3/2014 Yashiro et al. .................... 701/2
2014/0088827 A1*  3/2014 Yashiro et al. ................. 701/36

FOREIGN PATENT DOCUMENTS

EP  2 423 018 A1  2/2012
EP    2743140 A1 *  6/2014
JP   11-230013 A    8/1999

OTHER PUBLICATIONS

"User Guide for the Volvo on Call Mobile Application", May 19, 2012, XP055116533, Retrieved from the Internet on May 6, 2014.
(Continued)

*Primary Examiner* — John Q Nguyen
*Assistant Examiner* — Michael Whalen
(74) *Attorney, Agent, or Firm* — Birch, Stewart, Kolasch & Birch, LLP

(57) ABSTRACT

A vehicle includes a mobile communication device that controls in-vehicle devices remotely, a drive controller that controls drive of the vehicle, a communication controller that controls the wireless communication with the mobile communication device, and an auxiliary battery that activates the communication controller and an in-vehicle-device controller controlling the in-vehicle devices. The communication controller includes a stopper that stops the wireless communication if a correlating temperature is lower than or equal to a predetermined temperature, the correlating temperature correlating with the temperature of the auxiliary battery acquired at a first predetermined time after a stop of the drive controller.

19 Claims, 6 Drawing Sheets

(51) Int. Cl.
*B60L 1/14* (2006.01)
*B60L 11/18* (2006.01)

(52) U.S. Cl.
CPC ......... *B60L11/1846* (2013.01); *B60L 11/1848* (2013.01); *B60L 11/1859* (2013.01); *B60L 11/1861* (2013.01); *B60L 11/1868* (2013.01); *B60L 2210/10* (2013.01); *B60L 2210/30* (2013.01); *B60L 2230/16* (2013.01); *B60L 2240/28* (2013.01); *B60L 2240/34* (2013.01); *B60L 2240/36* (2013.01); *B60L 2240/545* (2013.01); *B60L 2240/622* (2013.01); *B60L 2240/662* (2013.01); *B60L 2240/70* (2013.01); *B60L 2240/80* (2013.01); *B60L 2250/12* (2013.01); *B60L 2250/16* (2013.01); *B60L 2250/26* (2013.01); *B60L 2260/52* (2013.01); *B60L 2260/54* (2013.01); *B60L 2260/56* (2013.01); *B60L 2260/58* (2013.01); *Y02T 10/7005* (2013.01); *Y02T 90/16* (2013.01)

(56) References Cited

OTHER PUBLICATIONS

European Search Report mailed May 16, 2014 corresponding to European Application No. 131963437.1.

\* cited by examiner

VEHICLE

CROSS-REFERENCE TO THE RELATED APPLICATION

This application incorporates by references the subject matter of Application No. 2012-270646 filed in Japan on Dec. 11, 2012 on which a priority claim is based under 35 U.S.C. §119(a).

FIELD

The present invention relates to a vehicle provided with in-vehicle devices that can be remotely controlled with a mobile communication device.

BACKGROUND

Techniques have been developed and widely used for remote control of devices installed in automobiles (hereinafter, also referred to as "vehicles"). For example, techniques have been developed for starting engines of vehicles by remote control to preliminarily warm-up the engines, and for activating air conditions of vehicles by remote control to control a temperature in the vehicles after starting the engines before passengers enter the vehicles. Such techniques are disclosed in Japanese Laid-open Patent Publication No. 11-230013 (patent document 1).

Patent document 1 describes a technique involving a control circuit for control of an aftermarket electric device installed in a vehicle. This vehicle has an engine control circuit that is wirelessly controllable to start/stop the engine of the vehicle through operation of a portable controller (remote controller) provided with a start switch and a stop switch. The aftermarket electric device is turned on by an operation-start signal which is an operation signal from the start switch during operation of the engine and turned off by an operation-stop signal which is an operation signal from the stop switch during a halt of the engine.

In addition to the preliminary air-conditioning described above, the inventors have believed that electric vehicles and plug-in hybrid vehicles that are chargeable via household wall sockets can be more convenient with remote detection and control of the start and stop of the electrical charge of the vehicles in a chargeable state in which the charging systems of the vehicles are connected to electric sockets. Such remote control of various devices enhances the convenience of the vehicles in use.

Dedicated portable controllers provided for the respective devices to be remotely controlled lead to increased costs, management burden, and incorrect operation. Such drawbacks are solved by the technique disclosed in patent document 1, which enables devices to be remotely controlled by a portable controller.

This technique uses a switch operation logic of a single switch to remotely control multiple devices. Consequently, an increase in the number of devices to be remotely controlled causes an increase in the complexity of the switch operation logic. Such a complicated switch operation logic cannot be readily operated and may lead to incorrect operation. The portable controller may be equipped with switches corresponding to the devices to be remotely controlled. In such a case, however, the switch configuration of the portable controller becomes complicated, and makes operation difficult that incorrect operation would increase.

The inventors have conceived the use of mobile communication devices, such as mobile phones, for remote control of various devices in a vehicle. The mobile phones popular today are multifunctional mobile phones, which are referred to as "smartphones." Smartphones have functions similar to those of personal computers and personal digital assistants (PDAs), and typically are equipped with touch panel displays. Thus, application software can be downloaded to obtain desired functions, allowing smartphones to remotely control in-vehicle devices.

That is, the application software can be developed to display a menu and switch buttons on a touch panel display for remote control of devices and to operate the switch buttons. The application software can be downloaded to a smartphone, enabling the smartphone to be used as a remote controller of the devices. The flexibility in the menu display facilitates appropriate operations without incorrect operation.

Wireless communication between a mobile communication device, such as a smartphone, and a vehicle requires the vehicle to be equipped with a wireless communication device (communication control device) supporting the communication standard (network interface) employed by the mobile communication device. The communication standards of smartphones include Wi-Fi (trademark) and 3G. In addition to these, communication standards, such as WiMAX (trademark) and Bluetooth (trademark) may also be used.

Among these communication standards, Wi-Fi has a relatively high communication rate, a relatively large wireless communication distance, and a low running cost due to its high versatility that does not require a communication infrastructure. Thus, mobile communication devices that support Wi-Fi can be readily used for remote control of in-vehicle devices. In such a case, a wireless communication device supporting such a standard is installed in the vehicle. Generally, such a wireless communication device in the vehicle is always in a communication standby mode and is ready to receive transmission from a smartphone or any other devices at all times.

Unfortunately, the wireless communication device in the vehicle that is in a communication standby mode constantly discharges its battery, which is the power source of the wireless communication device, due to a standby current. As a result, the state of charge of the battery rapidly decreases. In other words, upon performing a wireless communication between mobile communication devices that support Wi-Fi and the vehicle, the constant standby mode of the wireless communication device is advantageous as above, whereas this standby state requires a large standby current and causes a rapid decrease the state of charge of the battery. Especially, the state of charge of a battery having a small capacity tends to drop significantly due to the consumption by the standby current. This is a major problem.

Electric vehicles and plug-in hybrid vehicles have large-capacity high-voltage sources (batteries for running the vehicles). A candidate method of charging the battery as the power source of the wireless communication device is periodic supply of electric power from the high-voltage source. This way, the electric power consumed by the wireless communication device for the stand-by current can be supplemented to constantly maintain the communication stand-by mode of the wireless communication device.

An important issue for electric vehicles and plug-in hybrid vehicles is an improvement in the cruising distance in motor traveling. Although the batteries are chargeable with high-voltage sources, there is a strong demand for saving the power charged in the high-voltage sources. A scheduled charge of a battery in a low-temperature environment may result in an insufficient charge capacity of the battery because the charge acceptance of the battery is lower than that in a normal-temperature environment. If the wireless communication device is constantly in a communication stand-by mode, the charge capacity of the battery runs short and the battery runs out.

SUMMARY

Technical Problems

An object of the present invention, which has been conceived in light of the issues described above, is to provide a vehicle that can prevent insufficient charge of batteries being power sources in a system including in-vehicle devices that are remotely controlled with a mobile communication device, such as a smartphone. Another object of the present invention is to achieve advantages through the configurations according to the embodiments of the present invention described below, the advantages not being achievable through conventional art.

Solution to Problems (1) The present invention provides a vehicle including a mobile communication device that controls in-vehicle devices remotely; a drive controller for controlling drive of the vehicle; a communication controller that controls wireless communication with the mobile communication device; and an auxiliary battery that activates the communication controller and an in-vehicle-device controller that controls the in-vehicle devices. The communication controller includes a stopper that stops the wireless communication if a correlating temperature is lower than or equal to a predetermined temperature, the correlating temperature correlating with the temperature of the auxiliary battery acquired at a first predetermined time after a stop of the drive controller.

The stop of the drive controller refers to the disconnection of the drive controller from a driving system as a result of the operation by an operator (i.e. modes referred to as IG_OFF and READY OFF). The temperature correlating with the temperature of the auxiliary battery is, for example, an actual temperature of the auxiliary battery, a peripheral temperature of the auxiliary battery, or an ambient temperature.

(2) Preferably, the stopper acquires an ambient temperature as the correlating temperature. In such a case, preferably a temperature sensor that detects the ambient temperature is installed in the vehicle.

(3) Preferably, the stopper acquires the correlating temperature at every given time after the first predetermined time until the drive controller is reactivated if the predetermined temperature is lower than the correlating temperature acquired at the first predetermined time after the stop of the drive controller, and stops the wireless communication if the correlating temperature is lower than or equal to the predetermined temperature.

(4) Preferably, the communication controller includes a recovery unit that recovers the wireless communication if the drive controller continues to operate for a second predetermined time while the wireless communication with the mobile communication device is stopped by the stopper.

(5) Preferably, the communication controller includes a corrector that corrects the second predetermined time.

(6) Preferably, the corrector corrects the second predetermined time in accordance with the correlating temperature.

(7) Preferably, the corrector corrects the second predetermined time in accordance with the state of charge of the auxiliary battery.

Advantageous Effects

The vehicle according to the present invention stops the wireless communication with the mobile communication device if the correlating temperature is equal to the predetermined temperature or less, the correlating temperature correlating with the temperature of the auxiliary battery acquired at the first predetermined time after the stop of the drive controller. This prevents insufficiency of electric power of the auxiliary battery being power source, and thereby certainly prevents the auxiliary battery from running out.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DESCRIPTION OF EMBODIMENTS

Embodiments will now be described with reference to the accompanying drawings.

The embodiments describe, as an example, a plug-in hybrid vehicle (PHV) equipped with a main battery (a battery for running) chargeable via a general power source (100 V source) provided outside the vehicle, such as a household wall socket. Devices installed in the vehicle (in-vehicle devices) include the main battery, which is a high-voltage source, an auxiliary battery that is charged from the main battery, and an auxiliary-battery charger that charges the auxiliary battery.

[1. Overall System Configuration]

Figure 2:
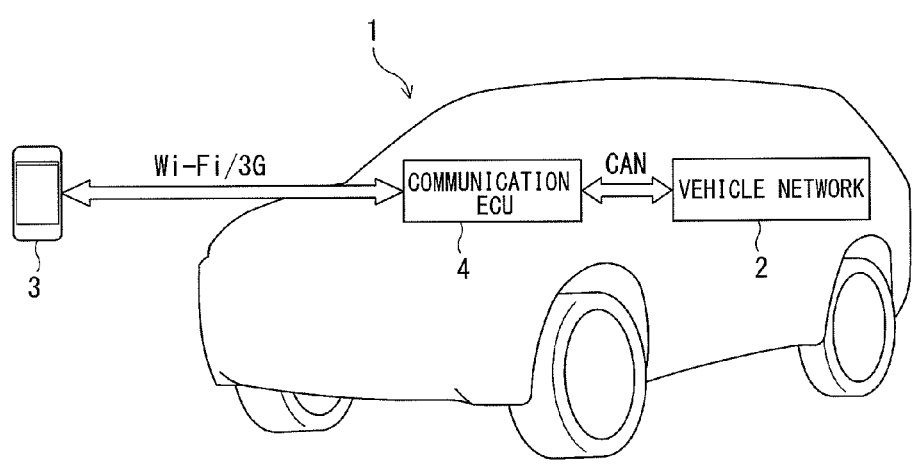
FIG. 2 is a schematic view of the communication controller of a vehicle and the remote control system therewith for in-vehicle devices according to an embodiment.

FIG. 2 is a schematic view of a communication controller and a remote control system for in-vehicle devices according to this embodiment. As illustrated in FIG. 2, the remote control system includes a vehicle network 2, a multi-functional portable terminal (smartphone) 3, and a communication electronic control unit 4 (communication controller, also referred to as "communication ECU 4"). The vehicle network 2 is installed in a vehicle 1 and includes various controllers (in-vehicle-device controllers) that control in-vehicle devices. The smartphone 3 or a mobile communication device remotely controls the in-vehicle devices. The communication ECU 4 is installed in the vehicle 1 and intervenes between the controllers of the vehicle network 2 and the smartphone 3. The communication ECU 4 is also referred to as a wireless communication device or an EV remote ECU that functions as a wireless router for controlling wireless communication with the smartphone 3.

A control area network (CAN) is widely used as the vehicle network 2 because of its high tolerance to noise and the independence of communication lines that allows communication via the remaining lines even after a disconnection of one of the lines. A CAN also connects the in-vehicle communication ECU 4 and the vehicle network 2.

The communication between the communication ECU 4 and the vehicle network 2 is established via a wire CAN, while the communication between the communication ECU 4 and the smartphone 3 is established via various wireless communication networks, such as a wireless fidelity (Wi-Fi) (trademark) scheme, a Third Generation (3G) scheme, a personal area network (PAN), and a radio frequency (RF) identification network. In this embodiment, the Wi-Fi scheme is used for the communication between the communication ECU 4 and the smartphone 3.

The Wi-Fi scheme is used for the communication between the communication ECU 4 and the smartphone 3 because the Wi-Fi scheme is supported by many commercially available smartphones and other mobile communication devices, has a relatively high communication rate, has a relatively large wireless communication distance (maximum sight distance for communication with the vehicle is approximately 200 m), and has a low running cost due to its high versatility that does not require a communication infrastructure.

In this embodiment, a mobile communication device using the Wi-Fi scheme is exemplified by a smartphone. Alternatively, any other mobile communication device (Wi-Fi devices), including portable game devices and notebook computers, can support the Wi-Fi communication and download application programs (hereinafter, also referred to as application software) for the remote control system.

Figure 3:
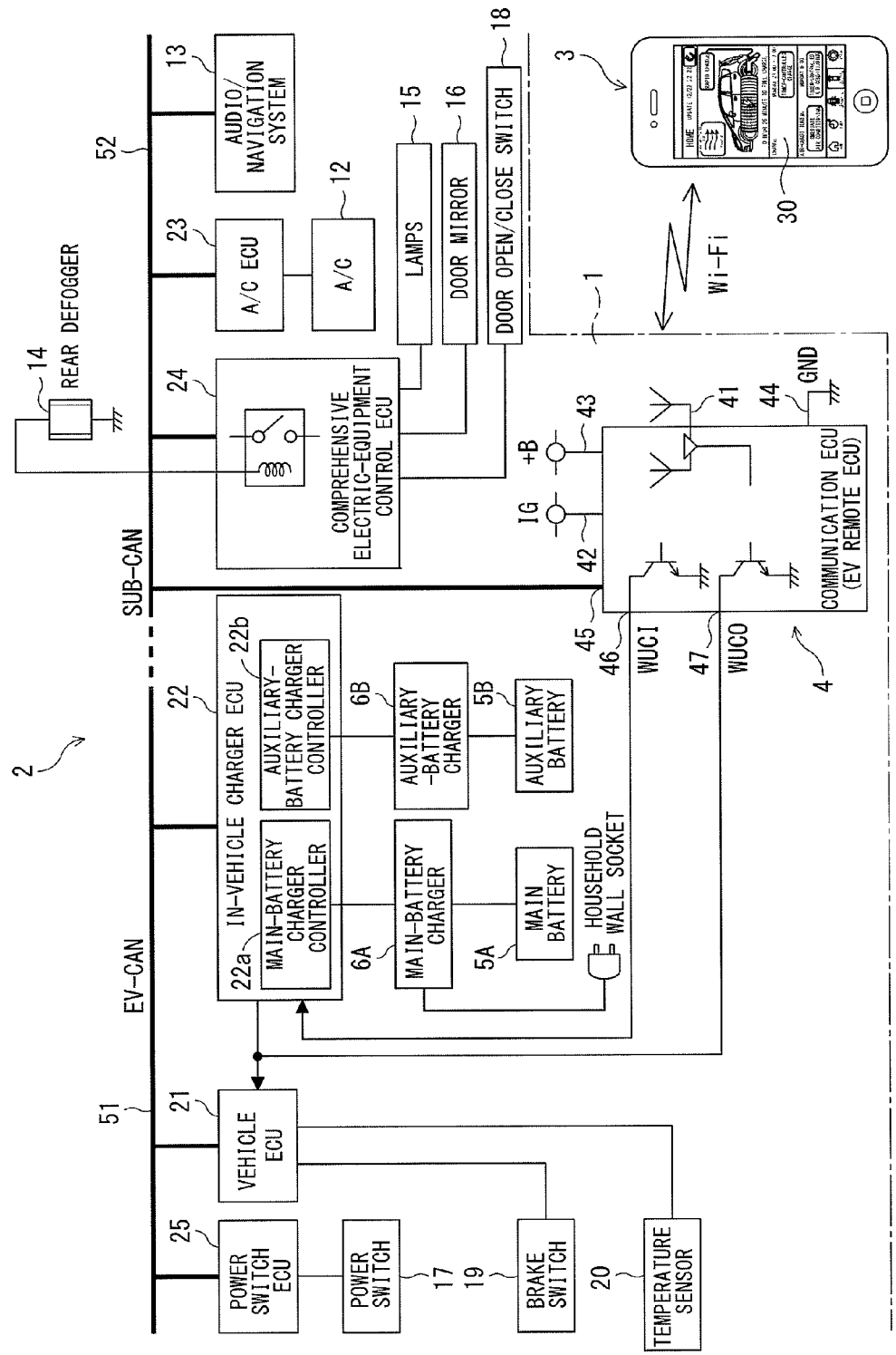
FIG. 3 is a detailed schematic view of the communication controller of a vehicle and the remote control system therewith for in-vehicle devices according to an embodiment.

FIG. 3 illustrates the detailed configuration of the remote control system. As illustrated in FIG. 3, the vehicle 1 is equipped with in-vehicle devices, such as a main-battery charger 6A that charges a main battery (a battery for running) 5A, an auxiliary-battery charger 6B that charges an auxiliary battery 5B, an air-conditioner (A/C) 12, an audio/navigation system 13, various electric components including a rear defogger 14, lamps 15, door mirrors 16, and wind-shield wipers (not shown), a power switch 17, and door open/close switches 18.

The vehicle 1 is also equipped with in-vehicle-device controllers that control the in-vehicle devices, such as a vehicle ECU (drive controller) 21, an in-vehicle charge ECU (charger) 22, an air-conditioning ECU 23, a comprehensive electrical-equipment control ECU 24, and a power switch ECU 25. The vehicle ECU 21 controls the drive of the vehicle 1. The in-vehicle charge ECU 22 controls the charge of the main battery 5A and the auxiliary battery 5B. The air-conditioning ECU 23 or air-conditioning controller controls the air-conditioner 12. The comprehensive electrical-equipment control ECU 24 controls the operation of the electric components, such as the rear defogger 14 and the lamps 15. The power switch ECU 25 controls the power switch 17. These in-vehicle controllers use the auxiliary battery 5B as power source and run on the auxiliary battery 5B.

The in-vehicle-device controllers or ECUs 21 to 25, the smartphone 3, and the communication ECU 4 each include an input/output device, a storage device (memory such as an ROM, an RAM, and/or non-volatile RAM), a central processing unit (CPU), and a timer/counter.

The vehicle ECU 21, the in-vehicle charge ECU 22, and the power switch ECU 25 are connected via an electric vehicle CAN (EV-CAN) 51, while the air-conditioning ECU 23, the comprehensive electrical-equipment control ECU 24, and the audio/navigation system 13 are connected via an electrical-equipment CAN (SUB-CAN) 52. The EV-CAN 51 and the SUB-CAN 52 are sub-networks separated in accordance with features, such as the communication quality, the communication reliability, and the communication rate, and are connected via a communication means, such as a gateway, abridge, or a repeater (not shown), allowing communication between the EV-CAN 51 and the SUB-CAN 52.

The vehicle ECU 21 is connected to a brake switch 19 and a temperature sensor 20. The power switch ECU 25 includes an operation unit or power switch controller (not shown) that turns on/off the power switch 17 by operating the driving mechanism (power-switch driving mechanism) of the power switch 17 in response to remote control by the smartphone 3.

The power switch 17 is a push switch installed near the driver's seat and is operated by the driver and the power switch controller. The door open/close switches 18 are sensors that detect the open/close states of the doors of the vehicle 1. The brake switch 19 is a sensor that detects the depression of the brake pedal by the driver. The temperature sensor 20 detects the ambient temperature AT of the exterior of the vehicle 1.

The vehicle ECU 21 receives information on the on/off state of the brake switch 19 (depression of brake) and the temperature detected by the temperature sensor 20. The power switch ECU 25 receives information on the on/off state of the power switch 17. The comprehensive electric-equipment control ECU 24 receives information on the on/off states (open/close states) of the door open/close switches 18 for the doors. Such information is transmitted to other ECUs, such as the vehicle ECU 21, via the EV-CAN 51 and the SUB-CAN 52.

The power switch 17 has four operating modes: accessories position (ACC), ignition on (IG_ON), READY ON, and READY OFF.

In the ACC mode, only the audio/navigation system 13 is activated (turned on) whereas the air-conditioner 12 and the high-voltage devices (in-vehicle devices that run on the high-voltage sources, such as the main-battery charger 6A and the auxiliary-battery charger 6B) are deactivated (turned off). That is, in the ACC mode, the batteries of the vehicle 1 can not be charged and the vehicle 1 cannot travel. The power switch ECU 25 selects the ACC mode in response to the power switch 17 being pushed once.

In the IG_ON mode, the audio/navigation system 13 and the air-conditioner 12 are activated, whereas the high-voltage devices are deactivated. That is, in the IG_ON mode, as in the ACC mode, the batteries of the vehicle 1 can not be charged and the vehicle 1 cannot travel. The power switch ECU 25 selects the IG_ON mode in response to the power switch 17 being pushed twice and sends this information to the air-conditioning ECU 23.

In the READY ON mode, all in-vehicle devices including the high-voltage devices are activated. In this mode, the vehicle 1 can travel, and the main battery 5A and the auxiliary battery 5B can be charged. The vehicle ECU 21 selects the READY ON mode upon reception of the information from the power switch ECU 25 on the power switch 17 being pushed and held during reception of the information from the brake switch 19 on the depression of the brake pedal.

In the READY OFF mode, which is also referred to as the IG_OFF mode, the vehicle ECU 21 and the driving system are disconnected (in this state, the vehicle ECU 21 is turned off). In the READY OFF mode, the vehicle 1 cannot travel, but the air-conditioner 12 and the main-battery charger 6A can be activated in response to commands associated to timer-scheduled air-conditioning and timer-scheduled charge, which are described below. The power switch ECU 25 selects the READY OFF mode in response to the power switch 17 being pushed three times.

The on/off state of the brake switch 19 (depression of brake) sent to the vehicle ECU 21, the temperature detected by the temperature sensor 20, and the on/off state of the power switch 17 sent to the power switch ECU 25 are input to the communication ECU 4 via the EV-CAN 51 and the SUB-CAN 52.

The in-vehicle charge ECU 22 includes functions of a main-battery charge controller 22a that controls the charge of the main battery 5A and an auxiliary-battery charge controller 22b that controls the charge of the auxiliary battery 5B.

Figure 1:
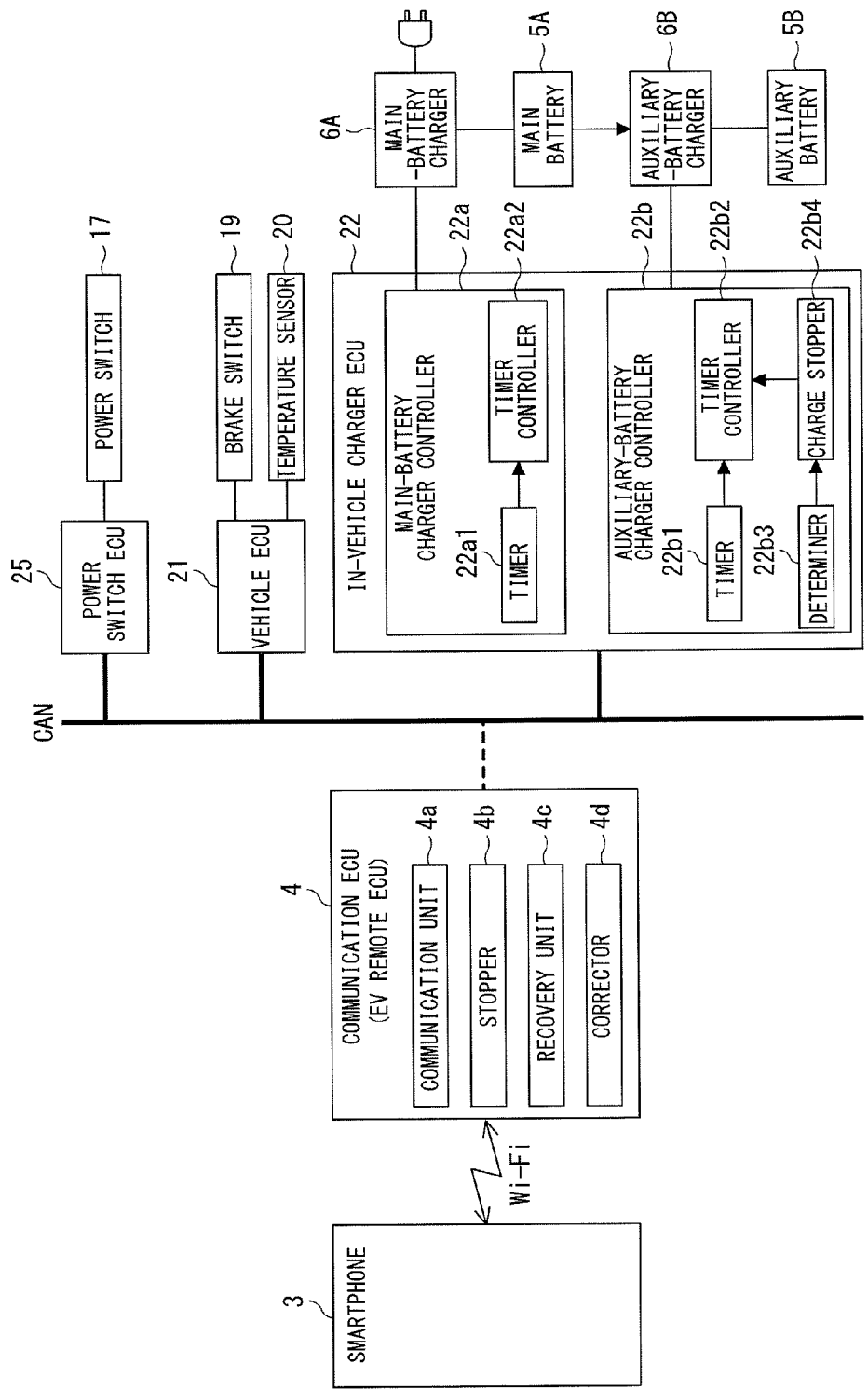
FIG. 1 is a block diagram of essential components of a communication controller of a vehicle and a remote control system therewith for in-vehicle devices according to an embodiment.

As illustrated in FIG. 1, the main-battery charge controller 22a controls the main-battery charger 6A to supply the main battery 5A with electric power from an external power source, so that the main battery 5A is charged. The main-battery charger 6A can charge the main battery 5A via a dedicated charge socket installed in a charge station or a general power source, such as a household wall socket.

Three charge modes for the main battery 5A under the control of the main-battery charge controller 22a are provided: "rapid charge" from a dedicated external rapid charger; "200-V normal charge" from a dedicated 200-V external charger; and "100-V normal charge" from a 100-V general power source, such as a household wall socket. The main-battery charge controller 22a controls the charge at real-time, for example, through charge via a charge cable connecting the household wall socket and the vehicle 1.

The main-battery charge controller 22a includes the charge control at real-time and a main-battery-charge timer controller 22a2, sets a timer 22a1 in advance in accordance with a charge schedule, and automatically charges the main battery 5A in accordance with the charge schedule. For example, a charge schedule is set with the timer 22a1 in advance for late-night charge (11:00 pm or after), and the charge cable remains connected. The main-battery-charge timer controller 22a2 automatically charges the main battery 5A in accordance with the charge schedule (11:00 pm or after). Such a function allows automatic charge during the night at which electricity is supplied at low-cost.

The auxiliary-battery charge controller 22b controls the auxiliary-battery charger 6B to supply the auxiliary battery 5B with electric power from the main battery 5A, so that the auxiliary battery 5B is charged. The auxiliary-battery charger 6B includes a DC-DC converter that lowers the high voltage charged in the main battery 5A to charge the auxiliary battery 5B.

The auxiliary-battery charge controller 22b includes an auxiliary-battery-charge timer controller 22b2 that sets a timer 22b1 in advance in accordance with a charge schedule, and automatically charges the auxiliary battery 5B in accordance with the charge schedule. The charge schedule of the auxiliary battery 5B may be set by an operator through a smartphone to set the timer 22b1 or the timer 22b1 may be set to a fixed value in advance without setting by the operator.

The automatic charge carried out by the auxiliary-battery-charge timer controller 22b2 in accordance with a charge schedule is also referred to as "timer-scheduled charge." Timer-scheduled charge starts at a time set in advance and continues for a predetermined charge time $T_{ch}$. The charge time $T_{ch}$ is the time required to charge the electrical power consumed per day in the auxiliary battery 5B and is set to, for example, 10 minutes in advance.

The auxiliary-battery charge controller 22b further includes a determiner 22b3 and a charge stopper 22b4. The determiner 22b3 determines whether timer-scheduled charge is available. Time-controller charge is not available during maintenance of the vehicle 1. Timer-scheduled charge refers to automatic charge of the auxiliary battery 5B from the main battery 5A. Unlike normal charge via a charge gun, timer-scheduled charge cannot be recognized from the exterior of the vehicle 1. Thus, timer-scheduled charge triggered by sudden activation of the high-voltage devices during maintenance of the vehicle 1 may cause unexpected incidents.

To avoid these, the determiner 22b3 determines whether or not there is a possibility that maintenance of the vehicle 1 is being carried out. This determination, for example, is based on information from the door open/close switches 18 on the doors and/or information from a height sensor (not shown). That is, the determiner 22b3 determines that timer-scheduled charge is not available due to maintenance of the vehicle 1 if at least one door of the vehicle 1 is open and/or the vehicle 1 is lifted. The result by the determiner 22b3 is sent to the charge stopper 22b4.

If the determiner 22b3 determines that timer-scheduled charge is not available, the charge stopper 22b4 cancels the timer-scheduled charge by the auxiliary-battery-charge timer controller 22b2 and disables the control or activation of the auxiliary-battery charger 6B. In other words, the charge stopper 22b4 stops the timer-scheduled charge from the main battery 5A to the auxiliary battery 5B in accordance with the result of the determiner 22b3.

For example, if the timer 22b1 of the auxiliary battery 5B is set to 2:00 pm, the auxiliary-battery-charge timer controller 22b2 controls the auxiliary-battery charger 6B every day at 2:00 pm to start the charge of the auxiliary battery 5B. However, if the maintenance of the vehicle 1 is being carried out at 2:00 pm, the timer-scheduled charge is canceled for the day.

The auxiliary-battery charger 6B charges the auxiliary battery 5B through timer-scheduled charge by the auxiliary-battery-charge timer controller 22b2 and automatic charge by supplying electric power from the main battery 5A to the auxiliary battery 5B. Such automatic charge is automatically stopped after a predetermined operating time (for example, 10 minutes) because the auxiliary battery 5B is assumed to be charged to a sufficient level.

The auxiliary battery 5B can be charged from the main battery 5A or can be charged from an external source in a manner similar to the main battery 5A.

As illustrated in FIG. 3, the air-conditioning ECU 23 controls the air-conditioner 12 on the basis of the information from the vehicle ECU 21 and communication ECU 4. The air-conditioner 12 carries out the air-conditioning (cooling/heating) of the interior of the vehicle 1 and blasts air onto the front windshield. In the timer-scheduled air-conditioning mode, the air-conditioning schedule is set by a timer in advance, and air-conditioning of the interior of the vehicle 1 and air blast onto the front windshield are carried out in accordance with the air-conditioning schedule. The air-conditioning ECU 23 controls the air-conditioning at real time and the timer-scheduled air-conditioning.

The timer-scheduled air-conditioning is referred to as "preliminary air-conditioning" and carried out if the interior of the vehicle 1 should be air-conditioned before a passenger or passengers enter the vehicle 1. If a driver is to ride the vehicle 1 for commuting to work every day around the same time, the timer can be set to activate the air-conditioner 12 shortly before the expected time of entering the vehicle 1. The timer can set the day and time for activating the air-conditioning.

The air-conditioning modes of the air-conditioner 12 include "air-conditioning (cooling) standby," "air-conditioning (cooling)," "air-conditioning (heating) standby," "air-conditioning (heating)," "air-conditioning (front windshield blast) standby," and "air-conditioning (front windshield blast)" modes. In each air-conditioning standby mode, the air-conditioning is scheduled but is not yet activated.

The comprehensive electric-equipment control ECU 24 controls the operation of the electric components, such as the rear defogger 14, the lamps 15 including the head lights and position lamps, the door mirrors 16, and the windshield wipers, and detects the operating state of these electric components.

[2. Communication Controller]

As illustrated in FIG. 3, the communication ECU 4 includes a transmission/reception antenna 41, an IG terminal 42, a +B terminal 43, a ground terminal 44, and a CAN connection terminal 45. The IG terminal 42 is connected to an ignition power source while the power switch 17 is being at the IG_ON position. The +B terminal 43 is in constant connection with the battery power source. The ground terminal 44 is grounded. The CAN connection terminal 45 is connected to the SUB-CAN 52. The communication ECU 4 also includes a charge-standby-signal output unit 46 and a system-start-signal output unit 47. The charge-standby-signal output unit 46 outputs a signal WUCI for temporarily holding the charge functions. The system-start-signal output unit 47 outputs a WakeUp signal WUCO for starting the system of the electric vehicle.

The communication ECU 4 includes a communication unit 4a, as illustrated in FIG. 1. The communication unit 4a receives information on the remote control by the smartphone 3, sends this information to the vehicle ECU 21 and the in-vehicle charge ECU 22, and also sends information including the charge state of the main battery 5A and the control state of the vehicle ECU 21 to the smartphone 3 so as to carry out wireless communication control. The smartphone 3 downloads application software for the remote control system and launches this application software to display various images on the touch panel display 30 of the smartphone 3. Descriptions are omitted on the images displayed on the touch panel display 30.

The communication ECU 4 uses the auxiliary battery 5B as power source and runs on the auxiliary battery 5B. The communication ECU 4 is constantly in a communication stand-by mode and can receive signals from the smartphone 3, regardless of the operating state of the main battery 5A. In other words, the auxiliary battery 5B constantly supplies the stand-by current to the communication ECU 4. In particular, wireless communication, for example, by a Wi-Fi scheme, requires a large stand-by current of the communication ECU 4, which often causes a reduction in the charge capacity of the auxiliary battery 5B. To prevent this, the power consumption per day (24 hours) of the communication ECU 4 in stand-by mode is estimated in advance, and the power of the auxiliary battery 5B consumed per day by the communication ECU 4 is charged during operation of the high-voltage devices (i.e., in the READY ON mode) or by timer-scheduled charge. In this way, the auxiliary battery 5B is prevented from running out.

However, if the timer-scheduled charge by the auxiliary battery 5B is stopped by the charge stopper 22b4, as described above, timer-scheduled charge is not carried out that day. Further at this time, if the high-voltage devices are not activated (for example, if the vehicle 1 does not enter the READY ON mode), the auxiliary battery 5B is not charged. If the communication ECU 4 is constantly in a communication stand-by state in such a case, the communication ECU 4 continuously consumes the power of the auxiliary battery 5B, causing the auxiliary battery 5B to run out by insufficiency of electric power. Alternatively, even if timer-scheduled charge of the auxiliary battery 5B is carried out, when the temperature of the auxiliary battery 5B is low, causing low charge acceptance, the auxiliary battery 5B cannot be charged to a desired level and may run out.

In this embodiment, the communication ECU 4 limits the communication to prevent the auxiliary battery 5B from running out. The communication ECU 4 functions as a stopper 4b, a recovery unit 4c, and a corrector 4d to limit the communication, as illustrated in FIG. 1.

The stopper 4b turns off the communication stand-by mode of the communication unit 4a (in other words, stops the wireless communication between the smartphone 3 and the communication ECU 4), if one of the three conditions described below is met.

The first condition consists of: no entrance of the READY ON mode until a first predetermined time T1 elapses from the start of the READY OFF mode, and no timer-scheduled charge. The timer-scheduled charge is normally carried out every day at a predetermined time in accordance with the charge schedule, but may be stopped by the charge stopper 22b4, as described above. In such a case, if the vehicle 1 does not enter the READY ON mode, the charge capacity of the auxiliary battery 5B remains low because power is not charged. Thus, the stopper 4b turns off the communication stand-by mode of the communication ECU 4. The first predetermined time T1 is longer than 24 hours and, for example, is set to 36 hours depending on the capacity of the auxiliary battery 5B.

The second condition consists of: no entrance of the READY ON mode until a first predetermined time T1 elapses from the start of the READY OFF mode, and the ambient temperature AT acquired at the first predetermined time T1 being equal to or lower than a predetermined temperature $AT_0$. The first predetermined time T1 is the same as that in the first condition. The ambient temperature AT is acquired by the temperature sensor 20 as a temperature correlating with the temperature of the auxiliary battery 5B. In other words, a temperature that affects the charge acceptance of the auxiliary battery 5B can be readily detected by detecting the ambient temperature AT instead of directly detecting the temperature of the auxiliary battery 5B. The predetermined temperature $AT_0$ is a temperature at which the charge acceptance of the auxiliary battery 5B decreases and the auxiliary battery 5B is not charged to a desired level (which is equal to the power consumed by the auxiliary battery 5B in one day) even when timer-scheduled charge is carried out for a predetermined charge time $T_{CH}$. The predetermined temperature $AT_0$ is set, for example, to −15° C.

If there is no entrance of the READY ON mode until the first predetermined time T1 elapses from the start of the READY OFF mode and the ambient temperature AT detected by the temperature sensor 20 at that time (at the first predetermined time T1) is equal to or lower than the predetermined temperature $AT_0$, the stopper 4b determines that the auxiliary battery 5B is insufficiently charged in spite of the timer-scheduled charge and turns off the communication stand-by mode of the communication ECU 4. As a result, the wireless communication with the smartphone 3 by the communication unit 4a is disconnected, preventing a decrease in the remaining charge level of the auxiliary battery 5B due to the communication ECU 4 in the communication stand-by mode.

The timing of acquisition of the ambient temperature AT is not limited to that described above and may be any other time until the first predetermined time T1 elapses from the start of the READY OFF mode, which is, for example, before or after the time for timer-scheduled charge or during the night at which the ambient temperature AT is low. The correlating temperature is not limited to the ambient temperature AT and may be the peripheral temperature of the auxiliary battery 5B or the temperature of the main battery 5A. Alternatively, the correlating temperature may be the directly detected temperature of the auxiliary battery 5B.

The third condition consists of: the ambient temperature AT being equal to or lower than the predetermined temperature $AT_0$ before the start of the READY ON mode, even if the second condition is not satisfied. That is, if the ambient temperature AT is higher than the predetermined temperature $AT_0$ when the first predetermined time T1 elapses from the start of the READY OFF mode, the second condition is not satisfied, and thus, the communication unit 4a remains in the communication stand-by mode. If the READY ON mode is not turned on eventually, the power consumption of the auxiliary battery 5B continues to increase. At this time, if the ambient temperature AT is slightly higher than the predetermined temperature $AT_0$ (for example, −12° C.) and the charge acceptance of the auxiliary battery 5B is lower than that at normal temperatures, it is likely that the auxiliary battery 5B is not charged to a desired level through the timer-scheduled charge.

Thus, if the second condition is not satisfied and if the ambient temperature AT decreases to the predetermined temperature $AT_0$ or less before the READY ON mode is turned on, the stopper 4b turns off the communication stand-by mode of the communication ECU 4 at this time. This operation stops the wireless communication with the smartphone 3, and prevents the remaining charge level of the auxiliary battery 5B from decreasing due to the communication stand-by mode of the communication ECU 4. In this instance, the stopper 4b compares the ambient temperature AT with the predetermined temperature $AT_0$ at the first predetermined time T1 after the start of the READY OFF mode, and continues to periodically compare the ambient temperature AT with the predetermined temperature $AT_0$ every given time $T_s$. Such comparison can eliminate the constant monitoring of the variation in the ambient temperature AT, and thus can reduce the load for control. The ambient temperature AT varies greatly between day and night. Thus, for example, by setting the time $T_s$ to six hours, the variation in the ambient temperature AT can be appropriately monitored while reducing the load for control.

The recovery unit 4c recovers the communication stand-by mode of the communication ECU 4 if a predetermined recovery condition is satisfied while the communication stand-by mode of the communication ECU 4 is being turned off by the stopper 4b. In other words, the recovery unit 4c recovers the wireless communication by the communication unit 4a if the recovery condition is satisfied after the wireless communication with the smartphone 3 is stopped by the stopper 4b. The recovery condition consists of the continuation of the READY ON mode for at least a second predetermined time T2.

The second predetermined time T2 is a minimum time for supplementing (charging) the electric power consumed in the auxiliary battery 5B when the communication ECU 4 remains in the communication stand-by mode all day long, and is set, for example, to 10 minutes. The second predetermined time T2 is set to the minimum time to prevent a decrease in the cruising distance, which is caused by excess charge of the auxiliary battery 5B from the main battery 5A.

If the operating state of the vehicle ECU 21 continues for at least the second predetermined time T2, the recovery unit 4c determines that the charge of the auxiliary battery 5B reaches to a level sufficient for recovery of the wireless communication with the smartphone 3, and turns on the communication stand-by mode of the communication ECU 4. The recovery condition prevents the recovery of the wireless communication in the case where the READY ON mode is turned on for an instant. Thus, the auxiliary battery 5B is certainly prevented from running out.

The corrector 4d corrects the second predetermined time T2, which is used by the recovery unit 4c to determine the satisfaction of the recovery condition. The corrector 4d corrects the second predetermined time T2 in accordance with the ambient temperature AT detected by the temperature sensor 20. The auxiliary battery 5B is characterized in that the charge acceptance starts to decrease if the ambient temperature AT falls below a threshold temperature $AT_1$. Thus, if the ambient temperature AT decreases to the threshold temperature $AT_1$ or less, the corrector 4d corrects the second predetermined time T2 to make it longer as the ambient temperature AT decreases. The threshold temperature $AT_1$ ranges from about −8° C. to 10° C., depending on the characteristics of the adopted batteries and the adopted vehicle system. The threshold temperature $AT_1$ is higher than the predetermined temperature $AT_0$ mentioned above. In other words, the predetermined temperature $AT_0$ is set lower than the threshold temperature $AT_1$.

The corrector 4d may correct the second predetermined time T2 on the basis of the state of charge SOC of the auxiliary battery 5B, instead of the ambient temperature AT. This requires a means for acquiring the state of charge SOC of the auxiliary battery 5B. For example, information such as the voltage and/or current of the auxiliary battery 5B may be acquired to estimate the state of charge SOC of the auxiliary battery 5B. The estimation may include procedures of adding the power charged to the auxiliary battery 5B to the initial level of the auxiliary battery 5B while subtracting the power discharged from the initial level of the auxiliary battery 5B to track the power charged to and discharged from the auxiliary battery 5B.

The corrector 4d grasps the actual state of charge SOC of the auxiliary battery 5B and corrects the second predetermined time T2 to make it longer if the recovery condition is satisfied such that the auxiliary battery 5B is charged in the READY ON mode for the second predetermined time T2 but the charge of the auxiliary battery 5B is insufficient for the supplement of the power consumed in one day (i.e., the charge level of the auxiliary battery 5B runs short).

The corrector 4d may correct the second predetermined time T2 on the basis of the ambient temperature AT and the state of charge SOC of the auxiliary battery 5B. Alternatively, the corrector 4d may not be provided, and the second predetermined time T2 may be set to a fixed value (for example, 10 minutes). This reduces the load for control.

[3. Flowchart]

The communication limitation controlled by the communication ECU 4 according to this embodiment will now be described with reference to FIG. 4. In this example, the second predetermined time T2 is not corrected by the corrector 4d. That is, the second predetermined time T2, which is used for determination of the satisfaction of the recovery condition, is set to a fixed value. The process illustrated in the flow chart is repeated in predetermined cycles in the inside of the communication ECU 4.

Figure 4:
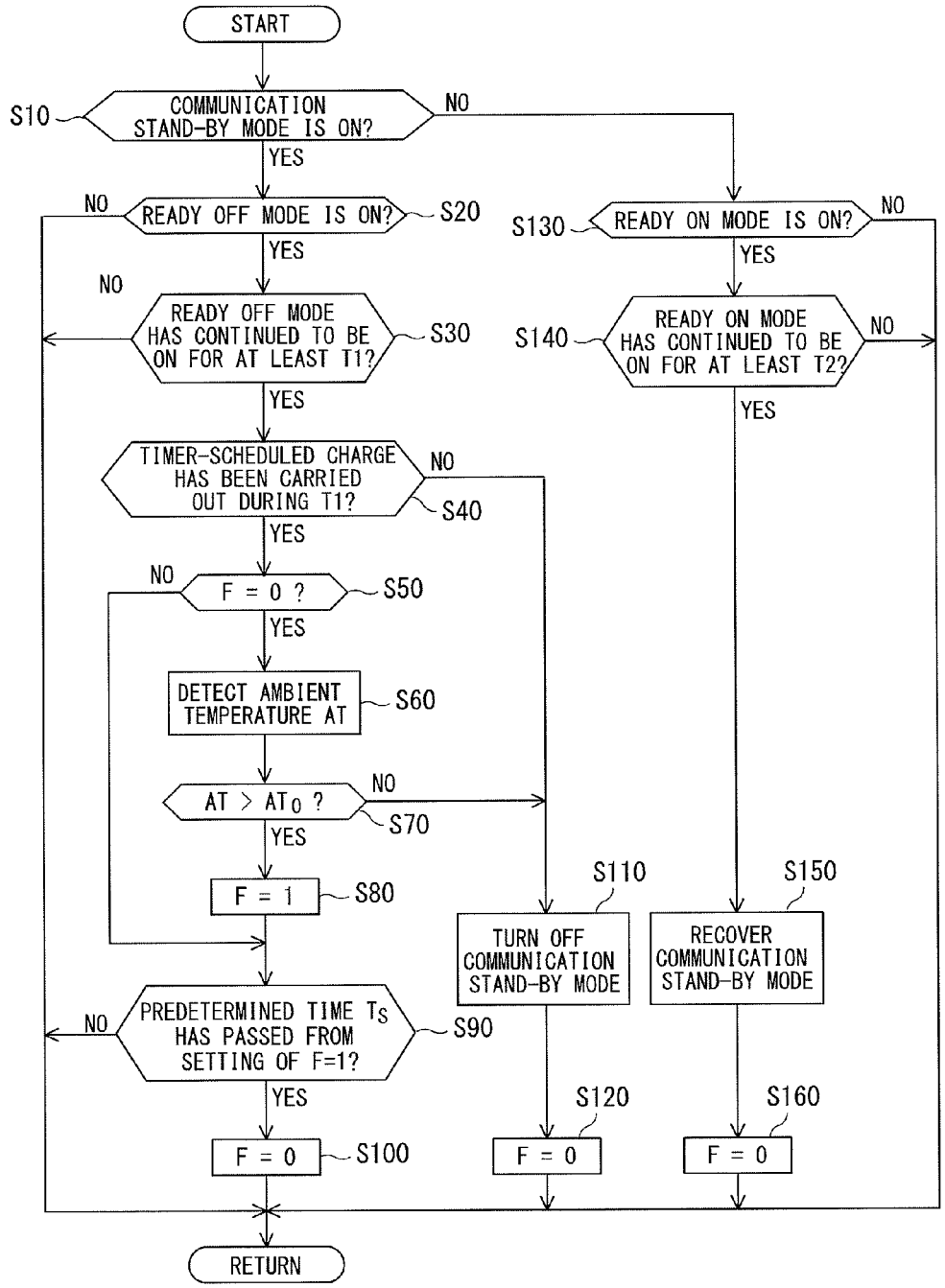
FIG. 4 is an example of a flow chart of the control carried out by the communication controller.

As illustrated in FIG. 4, Step S10 determines whether the communication ECU 4 is in the communication stand-by mode. If the communication unit 4a turns on the communication stand-by mode (communication on), the process goes to Step S20 to determine the satisfaction of the stop condition of the wireless communication. Alternatively, if the communication unit 4a does not turn on the communication stand-by mode (i.e., if the communication unit 4a turns off the wireless communication), the process goes to Step S130 to determine the satisfaction of the recovery condition of the wireless communication.

Described below is the determination of the satisfaction of the stop condition. Step S20 determines whether the READY OFF mode is on. If the READY OFF mode is on, the process goes to Step S30, whereas if the READY ON mode is on, the control cycle ends. Step S30 determines whether the READY OFF mode has continued for at least the first predetermined time T1. If the READY OFF mode has continued for at least the first predetermined time T1, the process goes to Step S40; else, the control cycle ends.

Step S40 determines whether the timer-scheduled charge by the auxiliary-battery-charge timer controller 22b2 has been carried out during the first predetermined time T1. Step S40 also determines whether the preliminary air-conditioning and the charge of the main battery 5A have been carried out during the first predetermined time T1 and the DC-DC converter has been activated for 10 minutes. If the determination at Step S40 is YES, the process goes to Step S50 to determine whether a flag F equals zero. If the determination at Step S40 is NO, the first condition described above is satisfied, and the process goes to Step S110 to turn off the communication stand-by mode by the stopper 4b (to stop the wireless communication between the smartphone 3 and the communication ECU 4). Then, Step S120 resets the flag F to zero, and the control cycle ends.

The flag F is a variable for determining whether the ambient temperature AT is higher than the predetermined temperature $AT_0$ (AT>$AT_0$) (i.e., a variable for determining whether the ambient temperature AT is to be redetected) as a result of comparing the ambient temperature AT and the predetermined temperature $AT_0$. The flag F equals one if AT>$AT_0$ (i.e., redetection of the ambient temperature AT is not required), whereas the flag F equals zero for any other result of the comparison. The initial value of the flag F is F=0. Thus, at first, Step S50 goes to Step S60 to detect the ambient temperature AT by the temperature sensor 20.

Step S70 determines whether the ambient temperature AT is higher than the predetermined temperature $AT_0$. If AT>$AT_0$, the process goes to Step S80, the flag F is set to F=1, and the process goes to Step S90. Alternatively, if AT≤$AT_0$, the second condition described above is satisfied, and the process goes to Step S110 to turn off the communication stand-by mode by the stopper 4b (i.e., the wireless communication between the smartphone 3 and the communication ECU 4 is stopped). Step S120 resets the flag F to zero, and the control cycle ends.

Step S90 determines whether the given time $T_s$ has elapsed from the moment of setting the flag F to one (i.e., the moment of the comparison of the ambient temperature AT and the predetermined temperature $AT_0$). If the given time $T_s$ has not elapsed, the control cycle ends. If the READY OFF mode continues for the time $T_s$, the process goes from Step S50 to Step S90 in the subsequent control cycles to repeat Step S90.

The predetermined time T1 of the determination condition of Step S40 is counted from the start of the READY OFF mode in the first control cycle (i.e., equal to the first predetermined time T1 in Step S30). After timer-scheduled charge is carried out, the first predetermined time T1 is counted from the previous timer-scheduled charge time. That is, the predetermined time T1 in Step S30 may differ from the predetermined time T1 in Step S40.

If Step S90 determines that the given time $T_s$ has elapsed, the process goes to Step S100 to reset the flag F to zero, and the control cycle ends. In the next cycle, the process goes to Step S60 again to detect the ambient temperature AT and the determination in Step S70 is carried out. If AT≤$AT_0$, the third condition described above is satisfied, and the process goes to Step S110 to turn off the communication stand-by mode by the stopper 4b (the wireless communication between the smartphone 3 and the communication ECU 4 is stopped). Then, Step S120 resets the flag F to zero, and the control cycle ends. The satisfaction of the stop condition is determined in this way.

The determination of the satisfaction of the recovery condition will now be described. If Step S10 determines that the communication stand-by mode is not turned on, the wireless communication between the smartphone 3 and the communication ECU 4 is being stopped. Thus, the process goes to Step S130 to determine whether the READY ON mode is turned on. If the READY ON mode is not turned on, the control cycle ends, and the wireless communication is not recovered. Alternatively, if the READY ON mode is turned on, it is determined whether the READY ON mode has continued for at least the second predetermined time T2. That is, it is determined whether the auxiliary battery 5B has been charged for the power consumed by the stand-by current of the communication ECU 4.

If the READY ON mode has continued for at least the second predetermined time T2, the process goes to Step S150 to recover the communication stand-by mode of the communication ECU 4 by the recovery unit 4c (the wireless communication is restored between the smartphone 3 and the communication ECU 4). Then, Step S160 resets the flag F to zero, and the control cycle ends. Alternatively, if the READY ON mode has continued for less than the second predetermined time T2, the control cycle ends. That is, the wireless communication is recovered only if the READY ON mode has continued for at least the second predetermined time T2.

[4. Operation and Advantageous Effect]

Figure 5:
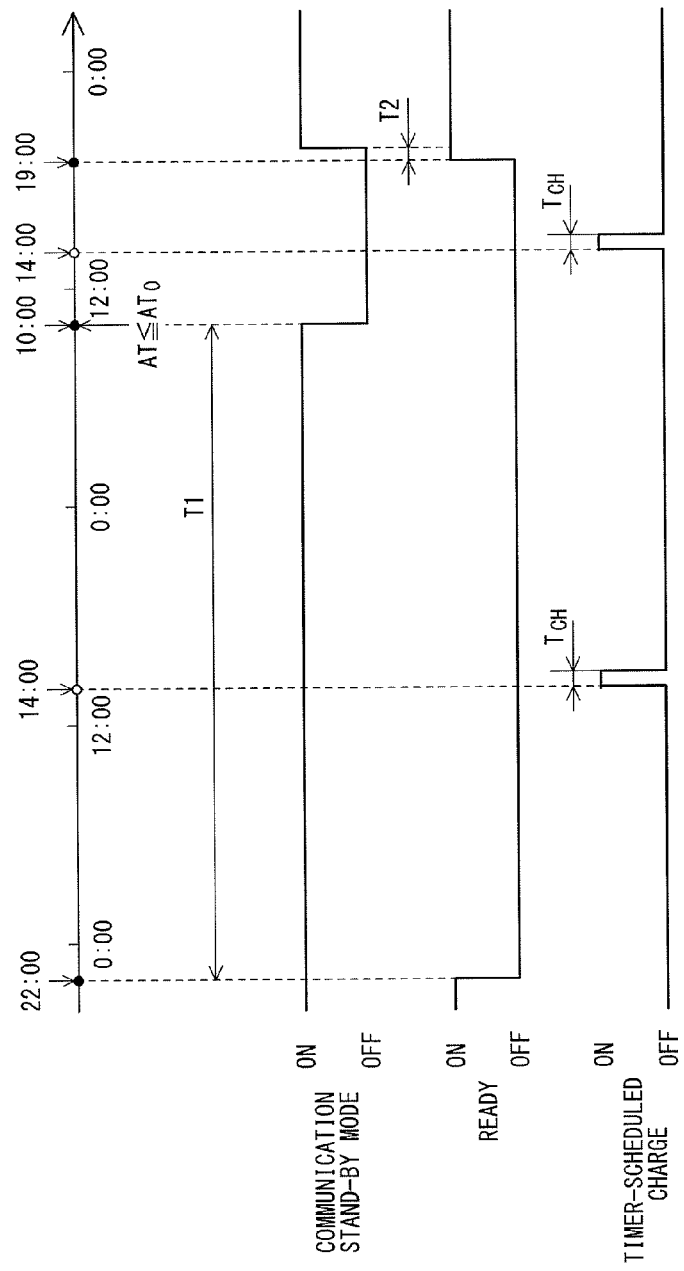
FIG. 5 is a timing chart of an example content of the control carried out by the communication controller.
Figure 6:
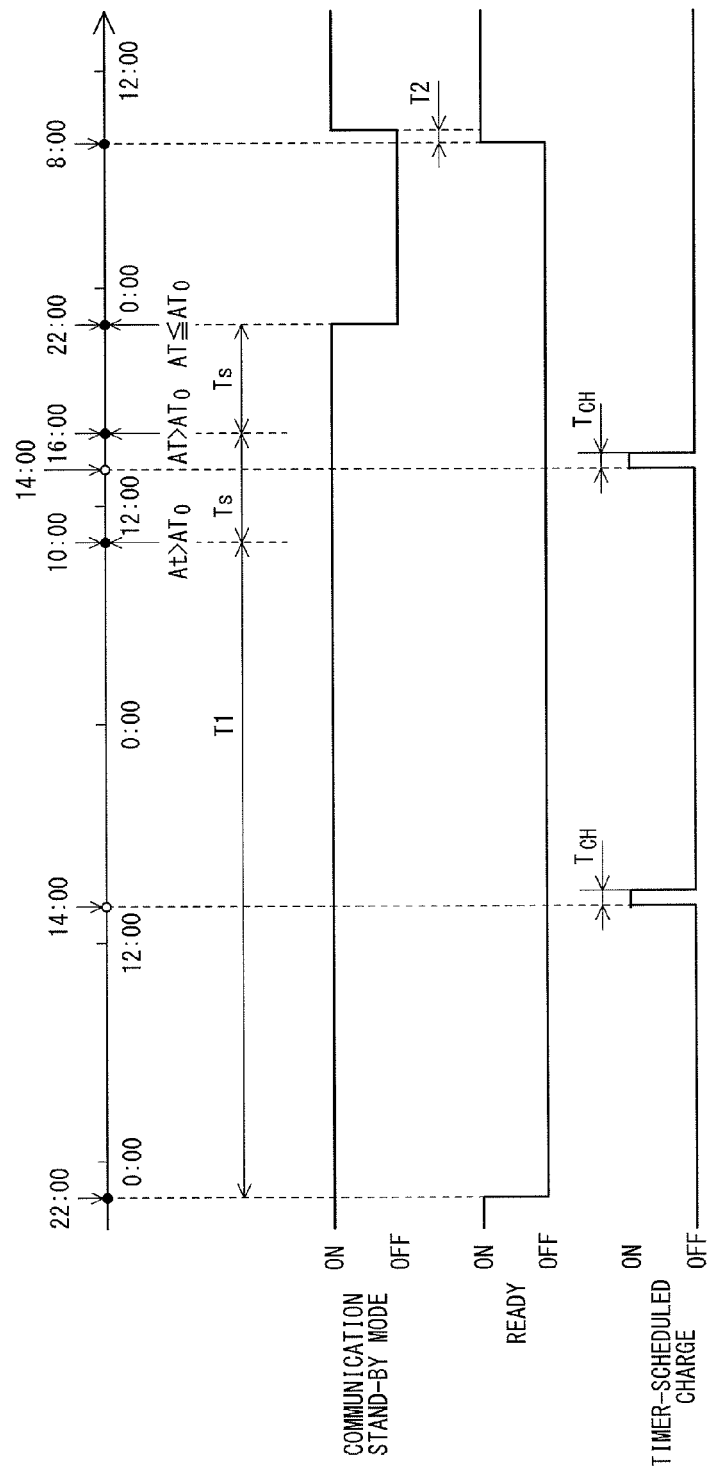
FIG. 6 is a timing chart of another example content of the control carried out by the communication controller.

The operation of the communication limitation will now be described with reference to FIGS. 5 and 6. FIGS. 5 and 6 are time charts illustrating the on/off states of the communication stand-by mode, the READY ON and READY OFF modes, and the timer-scheduled charge of the communication ECU 4 over time. The timer-scheduled charge illustrated in FIGS. 5 and 6 is normally carried out at 2:00 pm every day.

As illustrated in FIGS. 5 and 6, the switching from the READY ON mode to the READY OFF mode at 10:00 pm on Sunday immediately starts the counting of the timer in the communication ECU 4. Even if the READY OFF mode is turned on, the communication stand-by mode remains being on by the communication unit 4a. If the READY ON mode is never turned on until the first predetermined time T1 (36 hours) elapses from the start of the READY OFF mode, the ambient temperature AT is acquired when the first predetermined time T1 elapses (at 10:00 am on Tuesday). The acquired ambient temperature AT is compared with the predetermined temperature $AT_0$.

FIG. 5 illustrates a case where AT≤$AT_0$ holds at 10:00 am on Tuesday. In this case, the ambient temperature AT acquired when the first predetermined time T1 elapses (at 10:00 am on Tuesday) after the start of the READY OFF mode (10:00 pm on Sunday) is equal to the predetermined temperature $AT_0$ or less. Thus, the stopper 4b turns off the communication stand-by mode of the communication ECU 4 at 10:00 am on Tuesday.

FIG. 6 illustrates a case where AT≤$AT_0$ does not hold at 10:00 am on Tuesday. In this case, the ambient temperature AT acquired when the first predetermined time T1 elapses (at 10:00 am on Tuesday) after the start of the READY OFF mode (10:00 pm on Sunday) is higher than the predetermined temperature $AT_0$. Thus, the wireless communication with the smartphone 3 is not stopped at the time. If the READY OFF mode continues, the ambient temperature AT is acquired again at 4:00 pm on Tuesday when the given time $T_s$ (six hours) elapses after the time of the comparison of the ambient temperature AT and the predetermined temperature $AT_0$ (10:00 am on Tuesday). That is, the ambient temperature AT is compared with the predetermined temperature $AT_0$ again at 4:00 pm on Tuesday.

If $AT > AT_0$ holds again, the communication stand-by mode of the communication ECU 4 remains being on, and the ambient temperature AT is acquired at 10:00 pm on Tuesday after another given time $T_s$ (six hours) elapses. Then, if $AT \leq AT_0$, the stopper 4b turns off the communication stand-by mode of the communication ECU 4.

The communication stand-by mode turned off is turned on (the wireless communication is recovered) after the READY ON mode continues for at least the second predetermined time T2 from the switching of the READY OFF mode to the READY ON mode, as illustrated in FIGS. 5 and 6.

Thus, the vehicle 1 provided with the communication ECU 4 according to this embodiment stops the wireless communication with the smartphone 3 when the correlating temperature AT is equal to the predetermined temperature $AT_0$ or less, the correlating temperature AT correlating with the temperature of the auxiliary battery 5B, which is acquired within the first predetermined time T1 from the stop of the vehicle ECU 21 (i.e., the start of the READY OFF mode). This prevents insufficiency of electric power of the auxiliary battery 5B which is the power source of the communication ECU 4, and thereby prevents the auxiliary battery 5B from running out.

That is, a low correlating temperature AT causes a decrease in the charge acceptance of the auxiliary battery 5B. Thus, a desired charge level is less likely to be achieved through normal timer-scheduled charge. If the wireless communication stand-by mode remains being on in this state, the electric power of the auxiliary battery 5B decreases, and the auxiliary battery 5B will eventually run out. If the auxiliary battery 5B runs out, the vehicle 1 cannot be driven even with the normal operation of the other in-vehicle devices and the main battery 5A. Such a trouble, however, does not occur in the present invention.

The acquisition of the ambient temperature AT as a correlating temperature allows the ready acquisition of a temperature correlating to the temperature of the auxiliary battery 5B by the temperature sensor 20. Since the ambient temperature AT is used as a correlating temperature, a dedicated temperature sensor is not required for the auxiliary battery 5B, and thus, costs can be reduced.

The stopper 4b acquires the ambient temperature AT when the first predetermined time T1 elapses after the start of the READY OFF mode (at the stop of the vehicle ECU 21) and compares the acquired ambient temperature AT with the predetermined temperature $AT_0$. This allows the determination of the temperature and the stop control of the wireless communication to be carried out simultaneously, and thus, can reduce the load for control.

Even if the ambient temperature AT acquired within the first predetermined time T1 from the start of the READY OFF mode (the stop of the vehicle ECU 21) is higher than the predetermined temperature $AT_0$, the stopper 4b acquires the ambient temperature AT every given time $T_s$ from the first predetermined time T1 until the READY ON mode is turned on again and stops the wireless communication by the communication unit 4a when an ambient temperature AT equals to the predetermined temperature $AT_0$ or less. In this way, the auxiliary battery 5B can be certainly prevented from running out. Such acquisition of the ambient temperature AT at every given time $T_s$ eliminates the constant monitoring of the variation in the ambient temperature AT, and thus reduces the load for control.

The recovery of the wireless communication with the smartphone 3 after the READY ON mode (i.e., the operation of the vehicle ECU 21) continues for at least the second predetermined time T2 prevents the auxiliary battery 5B from running out. That is, not recovering the wireless communication in response to the READY ON mode being turned on for an instant, and establishing a recovery condition consisting of the continuation of the READY ON mode for at least the second predetermined time T2 maintains the state of charge SOC of the auxiliary battery 5B.

The second predetermined time T2 is set to a minimum time for the charge of the electric power consumed in the auxiliary battery 5B after the communication ECU 4 remains in the communication stand-by mode all day long. Such setting can prevent a decrease in the cruising distance caused by excess charge of the auxiliary battery 5B from the main battery 5A. The elimination of the correction of the second predetermined time T2 leads to a decrease in the load of calculation and the elimination of a means for estimating or detecting the state of charge SOC of the auxiliary battery 5B.

The corrector 4d for correcting the second predetermined time T2 optimizes the recovery condition for recovering the wireless communication.

For example, the correction of the second predetermined time T2 by the corrector 4d in accordance with the ambient temperature AT maintains an appropriate charge level of the auxiliary battery 5B with consideration of the effect of the temperature. An ambient temperature AT lower than the threshold temperature AT causes a decrease in the charge acceptance of the auxiliary battery 5B. Thus, if the ambient temperature AT decreases to the threshold temperature $AT_1$ or less, the second predetermined time T2 is corrected so as to be longer as the ambient temperature AT decreases, and thereby the charge level of the auxiliary battery 5B is appropriately maintained.

The correction of the second predetermined time T2 by the corrector 4d in accordance with the state of charge SOC of the auxiliary battery 5B involves the grasp of the actual state of charge SOC of the auxiliary battery 5B, and thus, can achieve more appropriate maintenance of the charge level of the auxiliary battery 5B.

[5. Others]

The present invention is not limited to the embodiments described above and may be modified in various ways within the scope of the invention.

The first predetermined time T1, the second predetermined time T2, the given time $T_s$, and the charge time $T_{CH}$, which are mentioned above, are merely examples and are not limited to the times mentioned above. For example, the first predetermined time T1 and the given time $T_s$ may be set to be shorter than the times mentioned above to decrease the intervals between the comparisons of the ambient temperature AT with the predetermined temperature $AT_0$. Thus, insufficiency of electric power in the auxiliary battery 5B can be more certainly prevented. Alternatively, the second predetermined time T2 and charge time $T_{CH}$ may be set to be longer than the times mentioned above to maintain a high state of charge of the auxiliary battery 5B.

The recovery condition is not limited to "the continuation of the READY ON mode for at least the second predetermined time T2," as described above. Instead, a temporary recovery condition may consist of "the READY ON mode being on for at least one instant," and a cancellation condition for the temporary recovery may consist of "the READY ON mode not continuing for the second predetermined time T2 after the recovery of the wireless communication." In this case, the satisfaction of the temporary recovery condition recovers the wireless communication with the smartphone 3, and the satisfaction of the cancellation condition for temporary recovery stops the wireless communication again. This can prevent the auxiliary battery 5B from running out.

In the embodiments described above, a Wi-Fi communication scheme is used. The communication standard, however, is not limited to this. The embodiments can be applied to mobile communication devices that can automatically connect to a receiver of a wireless LAN nearby. The preferred communication standard, such as the Wi-Fi communication scheme, has a high communication rate, has a relatively large wireless communication distance, has high versatility, eliminates upgrading of the infrastructure, and reduces running costs.

INDUSTRIAL APPLICABILITY

The present invention is effective for vehicles provided with in-vehicle devices that can be remotely controlled with a mobile communication device. In particular, the present invention can be effectively applied to mobile communication devices that can automatically connect to a receiver of a wireless LAN nearby.

REFERENCE SIGNS LIST 1 vehicle
2 vehicle network
3 mobile communication device or multifunction portable terminal (smartphone)
4 communication ECU (communication controller, wireless communication device)
4a communication unit
4b stopper
4c recovery unit
4d corrector
5A main battery (high-voltage source, in-vehicle device)
5B auxiliary battery (in-vehicle device)
6A main-battery charger (in-vehicle device)
6B auxiliary-battery charger (in-vehicle device)
12 air-conditioner (in-vehicle device)
13 audio/navigation system (in-vehicle device)
17 power switch
19 brake switch
20 temperature sensor
21 vehicle ECU (drive controller, HEV-ECU, in-vehicle-device controller)
22 in-vehicle charge ECU (charger, in-vehicle-device controller)
22a main-battery charge controller
22b auxiliary-battery charge controller
T1 first predetermined time
T2 second predetermined time
$T_s$ given time
$AT_0$ predetermined temperature The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A vehicle comprising:
   a mobile communication device that controls in-vehicle devices remotely;
   a drive controller that controls drive of the vehicle;
   a communication controller that controls wireless communication with the mobile communication device; and
   an auxiliary battery that activates the communication controller and an in-vehicle-device controller for controlling the in-vehicle devices,
   the communication controller including:
      a stopper that stops the wireless communication if a correlating temperature is lower than or equal to a predetermined temperature, the correlating temperature correlating with the temperature of the auxiliary battery acquired at a first predetermined time after a stop of the drive controller.

2. The vehicle according to claim 1, wherein the stopper acquires an ambient temperature as the correlating temperature.

3. The vehicle according to claim 1, wherein the stopper acquires the correlating temperature at every given time after the first predetermined time until the drive controller is reactivated if the predetermined temperature is lower than the correlating temperature acquired at the first predetermined time after the stop of the drive controller, and stops the wireless communication if the correlating temperature is lower than or equal to the predetermined temperature.

4. The vehicle according to claim 2, wherein the stopper acquires the correlating temperature at every given time after the first predetermined time until the drive controller is reactivated if the predetermined temperature is lower than the correlating temperature acquired at the first predetermined time after the stop of the drive controller, and stops the wireless communication if the correlating temperature is lower than or equal to the predetermined temperature.

5. The vehicle according to claim 1, wherein the communication controller includes a recovery unit that recovers the wireless communication if the drive controller continues to operate for a second predetermined time while the wireless communication with the mobile communication device is stopped by the stopper.

6. The vehicle according to claim 2, wherein the communication controller includes a recovery unit that recovers the wireless communication if the drive controller continues to operate for a second predetermined time while the wireless communication with the mobile communication device is stopped by the stopper.

7. The vehicle according to claim 4, wherein the communication controller includes a recovery unit that recovers the wireless communication if the drive controller continues to operate for a second predetermined time while the wireless communication with the mobile communication device is stopped by the stopper.

8. The vehicle according to claim 5, wherein the communication controller includes a corrector that corrects the second predetermined time.

9. The vehicle according to claim 6, wherein the communication controller includes a corrector that corrects the second predetermined time.

10. The vehicle according to claim 7, wherein the communication controller includes a corrector that corrects the second predetermined time.

11. The vehicle according to claim 8, wherein the corrector corrects the second predetermined time in accordance with the correlating temperature.

12. The vehicle according to claim 9, wherein the corrector corrects the second predetermined time in accordance with the correlating temperature.

13. The vehicle according to claim 10, wherein the corrector corrects the second predetermined time in accordance with the correlating temperature.

14. The vehicle according to claim 8, wherein the corrector corrects the second predetermined time in accordance with the state of charge of the auxiliary battery.

15. The vehicle according to claim 9, wherein the corrector corrects the second predetermined time in accordance with the state of charge of the auxiliary battery.

16. The vehicle according to claim 10, wherein the corrector corrects the second predetermined time in accordance with the state of charge of the auxiliary battery.

17. The vehicle according to claim 11, wherein the corrector corrects the second predetermined time in accordance with the state of charge of the auxiliary battery.

18. The vehicle according to claim 12, wherein the corrector corrects the second predetermined time in accordance with the state of charge of the auxiliary battery.

19. The vehicle according to claim 13, wherein the corrector corrects the second predetermined time in accordance with the state of charge of the auxiliary battery.

\* \* \* \* \*